United States Patent [19]

McConaughy et al.

[11] Patent Number: 4,982,324

[45] Date of Patent: Jan. 1, 1991

[54] METHOD OF AND SYSTEM FOR USING DEVICE DRIVERS TO COUPLE THE COMMUNICATION AND DATA STORAGE OF REMOTE COMPUTER SYSTEMS

[75] Inventors: John M. McConaughy; Steven T. Pancoast, both of Austin, Tex.

[73] Assignee: International Business Machines Corporation, Armonk, N.Y.

[21] Appl. No.: 287,752

[22] Filed: Dec. 19, 1988

[51] Int. Cl.$^5$ ............................................. G06F 15/16
[52] U.S. Cl. ................................. 364/200; 364/222.2; 364/228.3; 364/236.2; 364/248.1
[58] Field of Search .................. 364/200, 300, 900

[56] References Cited

U.S. PATENT DOCUMENTS 4,727,477 2/1988 Gavril ............................... 364/200

Primary Examiner—Raulfe B. Zache
Attorney, Agent, or Firm—H. St. Julian; Casimer K. Salys

[57] ABSTRACT

This invention relates to assigning disk drives associated with both a host computer and a remote computer coupled together by a communication link using normal DOS driver letters. DOS initialization of the host computer is postponed until a remote session is established with the remote computer and the remote computer provides information regarding the disk drives associated therewith. Upon receiving the disk drive information from the remote computer, the host completes its initialization and assigns drive letters associated with diskette drives associated with the host computer to diskette drives associated with the remote computer. Thus, host diskette drives are logically replaced by remote diskette drives. Any hard disk drives associated with the remote computer are assigned the next available drive letter on the host computer. Thus, the host computer and the remote computers become tightly coupled in that a user of the remote system has access to the diskette drives and any hard disk drives on the remote computer and any hard disk drives on the host computer.

14 Claims, 4 Drawing Sheets

METHOD OF AND SYSTEM FOR USING DEVICE DRIVERS TO COUPLE THE COMMUNICATION AND DATA STORAGE OF REMOTE COMPUTER SYSTEMS

TECHNICAL FIELD

This invention relates to a method of and a system for coupling computer systems and more particularly, to a method of and a system for interlocking computer systems such that the computer systems operate as one system.

BACKGROUND INFORMATION

It is common place today to access a first or host computer from a second or remote computer. Generally, when the host and remote computers are personal computers, each may include a plurality of diskette and/or hard disk drives associated therewith. When the host and remote computer are coupled together through a communication link, there is a need to distinguish the diskette and/or hard disk drives associated with the host computer from the diskette and/or hard disk drives associated with the remote computer. One known technique used today is to assign a prefix to letter designations associated with the respective disk drives of the host computer and a different prefix to letter designations associated with the respective disk drives of the remote computer. A majority of the personal computers execute commands in a disk operating system (DOS) environment. The multi-letter designation set forth in the known technique are contrary to a single letter convention required by DOS. DOS only accepts commands which include single letter drive letter designations. Thus, to execute commands involving files stored on the host computer utilizing the technique set forth above, such as file transfer, a special file transfer mode must be utilized because DOS will not recognize the multi-letter drive designations. After the file has been transferred, a user may re-enter the DOS environment to complete a desired task. Therefore, the use of multi-letter drive designations interfere with the normal flow of file execution in the DOS environment.

Consequently, there is a need for a technique which tightly couples a host computer and a remote computer such that disk drives associated with the remote computer operate as if directly attached to the host computer without the need of special drive letter designations.

SUMMARY OF THE INVENTION

This invention relates to a method of and system for tightly coupling first or host and second or remote computer systems wherein disk drives associated with the host and remote computer systems are specified using normal DOS drive letter. An IPL procedure is initiated in the host computer and is postponed until a remote session is established with the remote computer. The remote computer provides an interlock device driver stored in the host computer with information regarding the disk drives associated with the remote computer to enable the device driver to complete the DOS IPL initialization. After the DOS IPL initialization is completed, the interlock device driver thereafter provides the remote computer with logical drive assignments whereby the disk drives associated therewith become tightly coupled to the host computer. The logical drive assignments of the disk drives associated with the host and remote computers involves replacing any diskette drives associated with the host computer with diskette drives associated with the remote computer and mapping hard disk drives associated with the remote computer into the next available logical drive letters on the host computer. Thereafter, the disk drives associated with the remote computer operate as if they were directly attached to the host computer.

DESCRIPTION OF THE PREFERRED EMBODIMENTS

Figure 1:
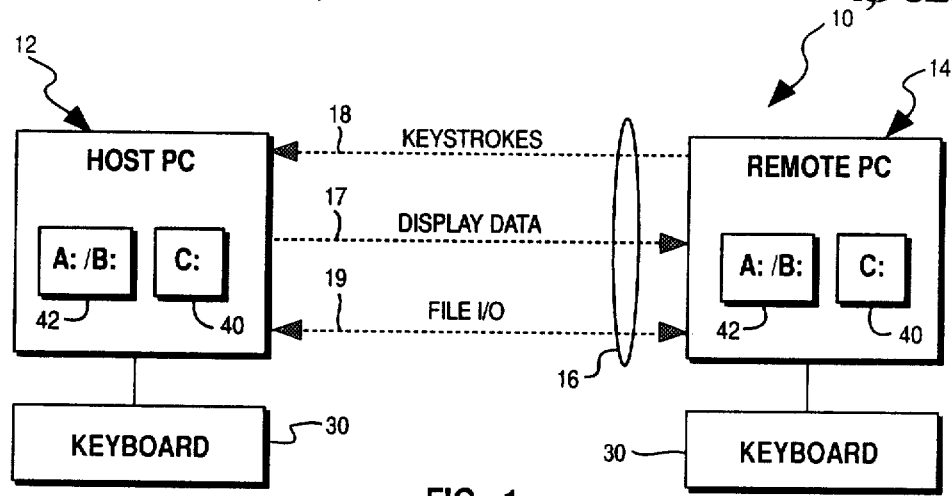
FIG. 1 is a block diagram of an information processing system on which the method of the present invention may be employed.

Referring to FIG. 1, there is shown an information processing system 10 having a first interactive type computer 12 interconnected to a second interactive type computer 14 by a communication link 16. The system 10 operates to allow each of the computers 12 and 14 to communicate with the other computer using established communication protocols whereby the communication link 16 is transparent to an end user of the system. In the preferred embodiment, each of the computers 12 and 14 is a personal computer (PC) such as an IBM XT, an IBM AT or an IBM Personal System/2 computer system. Computer 14, hereinafter referred to as the remote PC or system 14, serves as an intelligent computer to computer 12, hereinafter referred to as the host PC or system 12. The present invention enables the host PC 12 and the remote PC 14 to be tightly coupled so that input/output (I/O) access is provided to disk I/O devices on either PC in a remote control application. Display commands and data are transmitted from the host PC 12 to the remote PC 14 along the path 17 of the communication link 16. Keystroke commands and acknowledgements are transmitted from the remote PC 14 to the host PC 12 along the path 18 of the communication link 16. I/O request are transmitted between the host PC 12 and the remote PC 14 along path 19.

Figure 2:
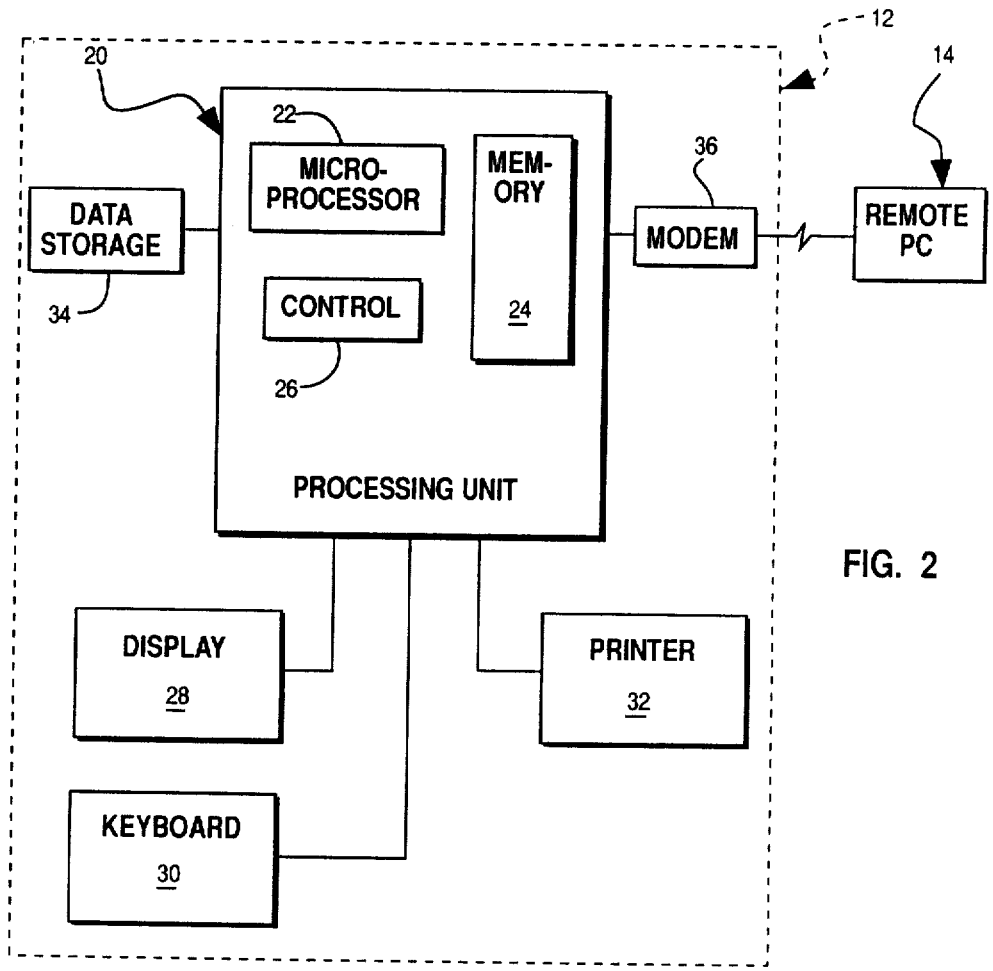
FIG. 2 is a block diagram of a computer utilized in the system of FIG. 1.

FIG. 2 illustrates a plurality of functional components which are included in the host and the remote PCs 12 and 14, respectively. Each of the PCs 12 and 14 includes a central processing unit 20 having a microprocessor 22, memory system 24 and a control unit 26 which controls input/output operations in addition to the interaction between the microprocessor 22 and the memory system 24. Each of the PCs 12 and 14 further includes a group of conventional peripheral units such as a display device 28, a keyboard 30, a printer 32, a disk storage unit 34, and a modem 36. Since the details of the above described functional components can be readily found in the prior art, only a brief functional description of each of the components will be set forth.

The central processing unit 20 corresponds to a "system unit" of one of the personal computer systems set forth above. The central processing unit 20 is provided with an operating system program which is normally employed to run the functional components. The operating system program is stored in memory system 24 along with one or more device drivers of the I/O devices associated with the respective PC and one or more application programs that an end user has selected to run. Depending on the capacity of the memory system 24 and the size of the application programs, portions of these programs, as needed, may be transferred to the memory system 24 from the data storage unit 34 which may include, for example, a hard disk drive 40 and a diskette drive 42 as shown in FIG. 1. The basic function of the data storage unit 34 is to store programs and data which are employed by the respective PCs 12 and 14 and which may readily be transferred to the memory system 24 when needed. The function of the diskette drive 42 is to provide a removable storage function for entering programs and data into the respective PC, and a vehicle for storing data in a form that is readily transportable for use on other interactive computers. The hard disk drive 40 serves similar functions in regards to the storage of data and programs and the entering of data and programs into the respective PC. Generally, access time of the hard disk drive 40 is faster than that of the diskette drive 42 and the storage, capacity is substantially greater.

Display device 28 and keyboard 30 together provide for an interactive operation of the respective PCs 12 and 14 wherein the interpretation that the respective PC gives to a specific keystroke by the user depends, in substantially all situations, on what is being displayed to the user at that point in time.

In certain situations, the user, by entering commands into one of the PCs 12 and 14, causes the respective computer to perform a certain function. In other situations, each of the PCs 12 and 14 request the entry of certain data, generally by displaying a prompt type of menu/message screen. The depth of the interaction between the user and the respective PC varies by the type of operating system and the application program, but is a necessary characteristic of the PC on which the method of the present invention may be employed.

As noted above, each of the PCs 12 and 14 includes an operating system. In the preferred embodiment of the invention, the operating system is a disk operating system (DOS) program which is stored in the memory unit 24 of each of the PCs 12 and 14. A configuration file, such as CONFIG.SYS, which determines the set-up of the respective PCs 12 and 14, is also stored in the memory unit 24 of each of the PCs 12 and 14. Whenever, the DOS program is activated, the DOS program executes the CONFIG.SYS file as a part of its initialization prior to executing an AUTOEXEC.BAT file which is also stored in the memory unit associated with the respective one of the PCs 12 and 14. A configuration command is used to load device drivers which are associated with the respective PCs 12 and 14. A device driver is an executable file which contains all of the code required to implement an I/O device or devices. When a device command is encountered in the CONFIG.SYS file, the DOS program calls an initiate (INIT) function associated with the device named in the device command. If the device is a disk device, such as the hard disk drive 40 or the diskette drive 42, the disk device must provide the following information to the DOS program: (1) a memory location at the end of the device driver code which will remain resident in the memory unit 24; (2) the number of disk drives represented by the device driver; and (3) the physical characteristics of the disk drives, such as type and size of the drives. The information relating to the number of the disk drives represented by the device driver is used to determine designation letter or letters which are to be assigned to the respective disk drives. After the initialization process has been completed, any references to the assigned designation or drive letters will result in the DOS program executing I/O requests to the respective device driver.

Figure 3:
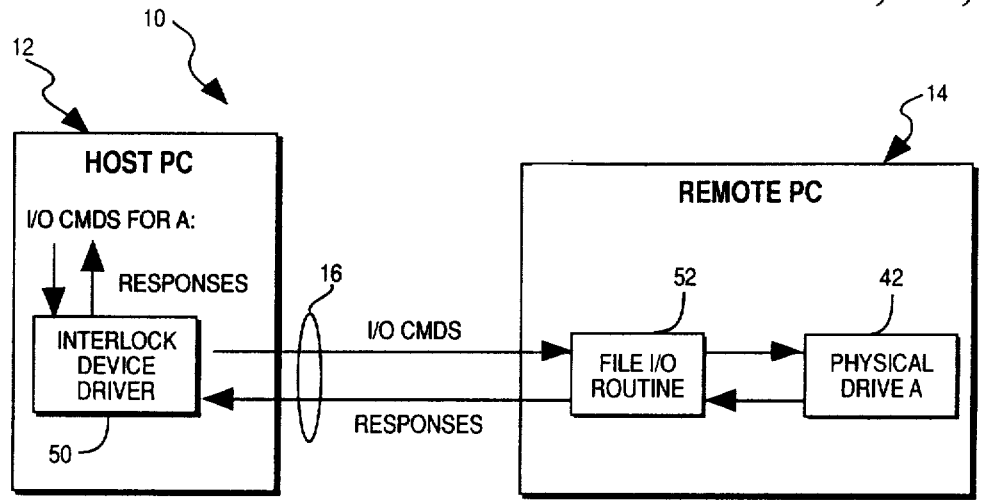
FIG. 3 is a block diagram of the information processing system of FIG. 1 illustrating the flow of data therein.

In the preferred embodiment of the invention, the device driver includes code to logically represent the remote drives and interrupt handlers which provide other functions such as a function for controlling any communications with the remote PC 14 or monitoring the disk drives on either the host or the remote PC as if they were all a part of a single system. A host interlock program is contained in a device driver file 50 (FIG. 3). This device driver 50 is added to the end of the CONFIG file. When the DOS program executes the CONFIG file stored in the host PC 12 and encounters a device command, it calls an initialize (INIT) function for the interlock program as a part of its device initialization. When the interlock program is first called, it does not contain any, information in regards to the remote PC 14. Therefore, the interlock program causes the DOS program to wait for a contact from the remote PC 14. Thus, a user of the host PC 12 causes the host PC 12 to enter a wait state and then travels to a destination associated with the remote PC 14. Thereafter, when the host PC 12 receives a call from the remote PC 14, a part of the sign-on data expected therefrom is information in regards to its disk drives. Upon the receipt of the information on the remote PC's disk drives, the host interlock device driver 50 passes the information on to the DOS program on the host PC 12. The DOS program then completes its configuration and initialization procedures. It should be noted that the DOS program is completely oblivious to the fact that a long delay has occurred.

The code, which remains resident as a part of the device driver 50, includes all of the code that handles communications with the remote PC 14, processing of keystroke data input from the remote PC, monitoring of the host display buffer and transmission of any display updates to the remote PC.

Once the interlock program has been loaded with the information received from the remote PC 14, the interlock device driver 50 provides access to an end user of the remote PC 14 to the disk drive 40 of the host PC 12 and all of the drives 40 and 42 of the remote PC. It should be noted that the host PC 12 and the remote PC 14 may include additional disk drives in addition to those shown in FIG. 1. Referring to FIG. 3, the device driver 50 interprets any I/O request for the remote PC 14, translating the request into absolute reads or writes and transmits the necessary interlock commands to the remote PC. Results of the access to the disk drives associated with the remote PC 14 is then returned to the host DOS program through the device driver 50. To the user of the remote PC 14, file access appears as if it was local.

For purposes of illustration and not limitation, drive letters may be assigned as follows: diskette drive A/B (FIG. 1) on the host PC 12 are reassigned to be the diskette drive A/B (FIG. 1) on the remote PC 14, the remaining drive letters on the host PC do not change, and any other drives on the remote PC are assigned to the next available letter on the host PC. For example, disk drive C on the remote PC 14 is reassigned to letter drive D on the host PC 12.

Figure 4:
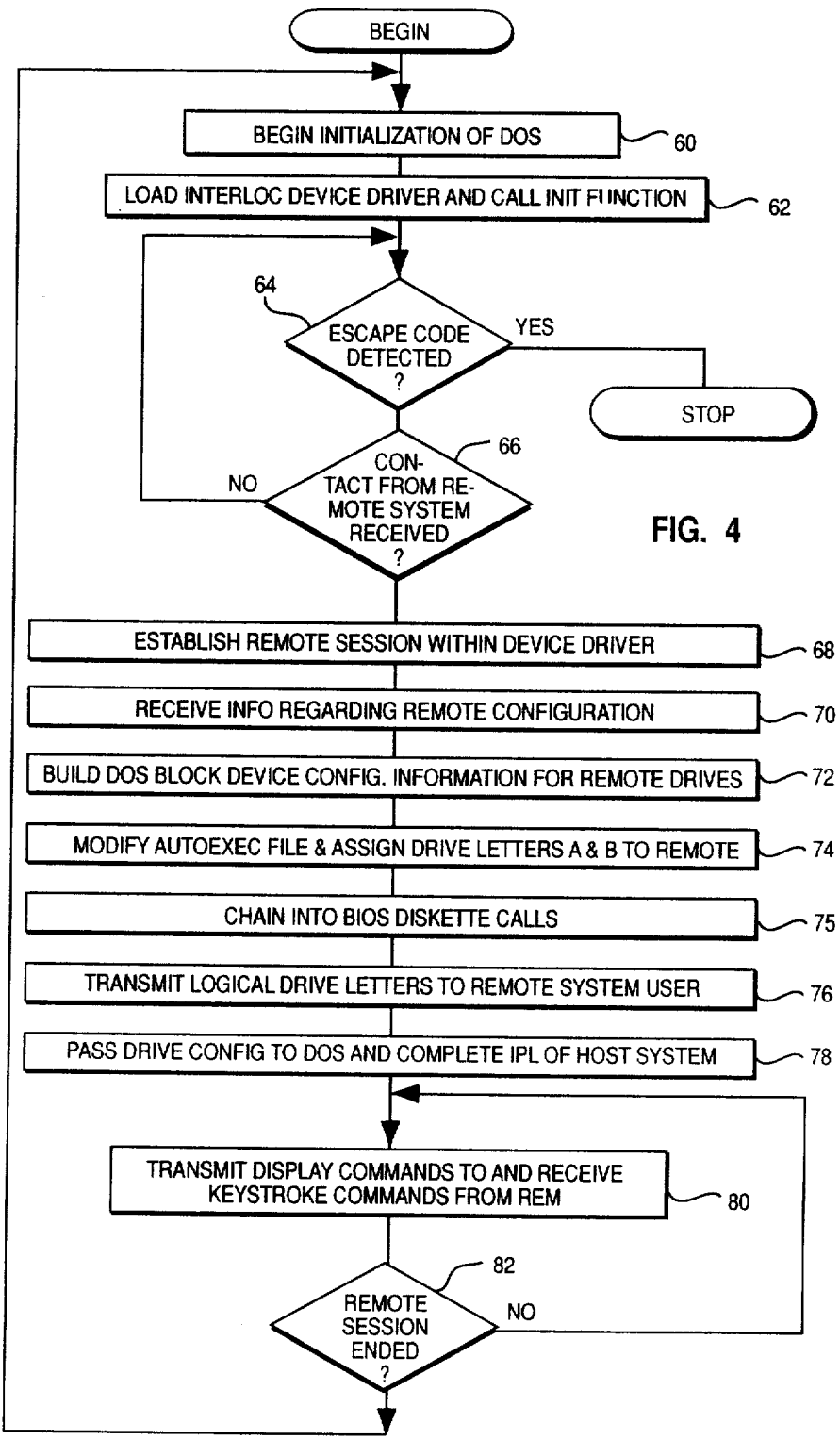
FIGS 4 and 5 are flow diagrams illustrating the detailed steps of the method of the present invention.

Referring to FIG. 4, there is shown a flow diagram for the host PC 12 in activating an interlock session with the remote PC 14. In step 60, the DOS program is initialized. The DOS program loads the interlock device driver 50 (FIG. 3) and calls the INIT function associated therewith in step 62. In step 64, it is determined if an escape function has been detected. If the escape function has been activated, the execution is stopped to enable an end user of the host PC to activate a function other than the interlock program. If escape function was not detected, the INIT function waits for contact from the remote PC 14 in step 66. A remote session is established within the interlock device driver in step 68. Information regarding the disk drives associated with the remote PC 14 is received by the interlock device driver in step 70. Step 72 facilitates the building of DOS block device configuration information for the remote disk drives as required by the DOS program. Step 74 facilitates the modification of the AUTOEXEC.BAT file to assign drive letters to the remote PC 14. In step 75, a portion of the interlock device driver 50 is chained into low level BIOS diskette calls to facilitate the transmission of an I/O request to the remote system 14. The logical drive letter assignments are transmitted to the user of the remote PC 14 in step 76. In step 78, the INIT function completes initial program load (IPL) by returning device configuration information to the DOS program. Display commands are thereafter transmitted to the remote PC 14 by the host PC 12 and keystroke commands are transmitted to the host PC by the remote PC in step 80. In step 82 it is determined whether the remote session has ended and control is transferred to step 80 if the session has not ended. Otherwise, control is transferred to step 60 to reinitialize the host PC 12.

Figure 5:
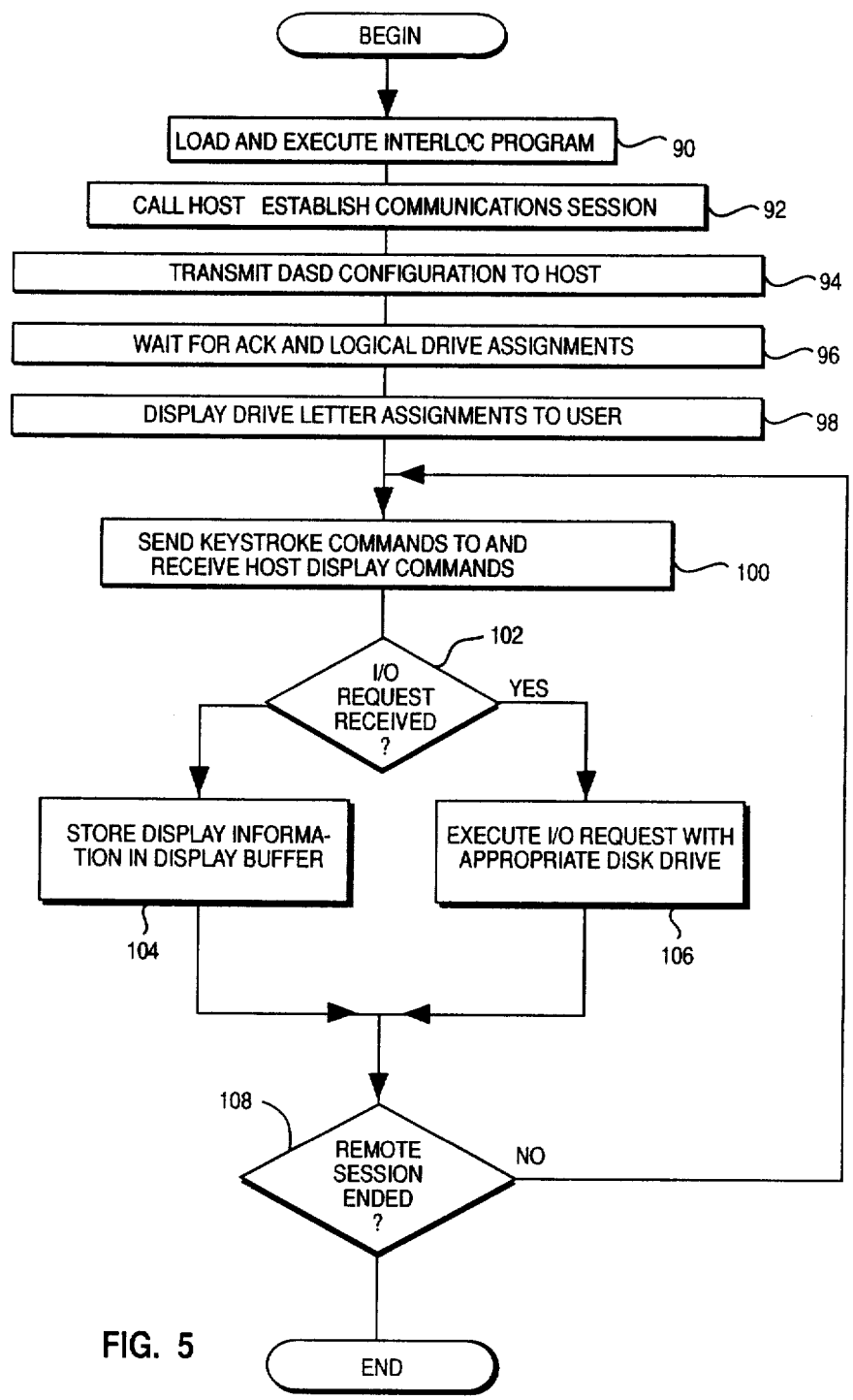

Referring to FIG. 5, there is shown a flow diagram for the remote PC 14 in activating the interlock session with the host PC 12. The user of the remote PC 12 causes the interlock program to be loaded and executed in step 90. The remote PC 14 calls the host PC 12 in step 92 to establish a communications session. Information regarding the disk drives associated with the remote PC 14 is transmitted to the host PC 12 in step 94. The remote PC 14 waits for an interlock session acknowledgement and logical drive assignments from the host PC 12 in step 96. The remote PC 14 then displays the drive letter assignments to the user of the remote system 14 in step 98. In step 100, keystroke commands are transferred to the host PC 12 and display commands are received by the remote PC 14. Step 102 determines whether the command received by the remote PC 12 is an I/O request or a display command. If the command is a display command, display information associated therewith is stored in a display buffer (not shown) in step 104. Otherwise, the command is an I/O request and the request is executed in regards to the appropriate disk or diskette drive associated with the remote PC 14. Step 108 determines whether the interlock session has ended and transfers control to step 100 if the session has not ended.

In summary, the invention relates to a method and a system wherein both host and remote disk drives are specified using normal DOS drive letters. The IPL procedure is initiated in the host PC 12 and is postponed until a remote session is established with the remote PC 14. The remote PC 14 provides the interlock device driver 50 with information regarding the remote disk drives to enable the device driver to complete the DOS initialization. The interlock device driver 50 provides the remote PC 14 with logical drive assignments whereby the remote drives becomes tightly coupled to the host PC. The tight coupling of the remote drives and the host PC 12 operate as if they were directly attached to the host PC. The remote diskette drives logically replace the host diskette drives. Remote hard disk drives are mapped into the next available logical drive letters on the host PC 12 which generates a tightly coupled system having access to all of the hard disk drives on the host and the remote PCs 12 and 14, respectively.

What is claimed is:

1. A method of interlocking first and second computer systems coupled by a communication link, said first and said second computer systems each configured with at least one disk drive associated therewith, said method comprises the steps of:

activating an initialization of a first computer system;

transmitting disk drive information by a second computer system to said first computer system;

assigning logical drive assignments to disk drives of said first and second computer systems; and interlocking said first and second computer systems such that said at least one disk drive of said second computer system performs as if said at least one disk drive is directly attached to said first computer system.

2. The method as recited in claim 1 further includes the step of establishing a session between said first and second computer systems.

3. The method as recited in claim 2 further includes the step of building block device configuration information for said at least one disk drive of said second computer system.

4. The method as recited in claim 3 further includes the step of modifying an autoexec file in said first computer system.

5. The method as recited in claim 4 wherein said first computer includes an operating system program being executed thereon and further includes the step of passing said device configuration information to said operating system program to complete the initialization of said first computer system.

6. The method as recited in claim 5 further includes the steps of:

transmitting display commands to said second computer system by said first computer system; and receiving keystroke commands by said first computer system from said second computer system.

7. The method as recited in claim 1 wherein said first computer and said second computer each include a plurality of diskette and/or hard disk drives and wherein the assigning step includes the steps of:

assigning letter designations attributable to each diskette drive of said first computer to each respective diskette drive of said second computer;

assigning a next available letter designation of said first computer to each hard disk drive of said second computer; and transmitting all of said letter designations of said disk drives to said second computer.

8. A system for interlocking first and second computer systems coupled by a communication link, said first and said second computer systems each configured with at least one disk drive, said system comprises:

means for activating an initialization of a first computer system;

means for transmitting disk drive information by a second computer system to said first computer system;

means for assigning responsive to said transmitted disk drive information logical drive assignments to disk drives of said first and second computer systems; and means for interlocking said first and second computer systems responsive to said logical drive assignments such that said at least one disk drive of said second computer system performs as if said at least one disk drive is directly attached to said first computer system.

9. The system as recited in claim 8 further includes means for establishing a session between said first and second computer systems.

10. The system as recited in claim 9 further includes means for building block device configuration information for said at least one disk drive of said second computer system.

11. The system as recited in claim 10 further includes means for modifying an autoexec file in said first computer system.

12. The system as recited in claim 11 wherein said first computer includes an operating system program being executed thereon and further includes means for passing said block device configuration information to said operating system program to complete the initialization of said first computer system.

13. The method as recited in claim 12 further includes:

means for transmitting display commands to said second computer system by said first computer system; and means for receiving keystroke commands by said first computer system from said second computer system.

14. The system as recited in claim 8 wherein said first computer and said second computer each include a plurality of diskette and/or hard disk drives and wherein the assigning means includes:

means for assigning letter designations attributable to each diskette disk drive of said first computer to each respective diskette drive of said second computer;

means responsive to assigned letter designations for assigning a next available letter designation of said first computer to each hard disk drive of said second computer; and means responsive to all assigned letter designations for transmitting all of said letter designations of said disk drives to said second computer.

* * * * *